United States Patent
Juergens

[11] 3,820,616
[45] June 28, 1974

[54] CRAWLER VEHICLE WITH DUAL EXTENSIBLE SIDE FRAMES

[75] Inventor: Dieter C. Juergens, South St. Paul, Minn.

[73] Assignee: American Hoist & Derrick Company, St. Paul, Minn.

[22] Filed: Feb. 3, 1972

[21] Appl. No.: 223,252

[52] U.S. Cl. .............................................. 180/9.48
[51] Int. Cl. ............................................ B62d 55/00
[58] Field of Search ... 180/9.48, 9.64, 6.48, DIG. 2; 280/34 A, 34 R

[56] References Cited
UNITED STATES PATENTS

| | | | |
|---|---|---|---|
| 2,681,231 | 6/1954 | Kondracki | 180/9.48 |
| 2,763,330 | 9/1956 | Potter | 180/9.48 |
| 3,036,650 | 5/1962 | Cimino | 180/9.48 |
| 3,205,961 | 9/1965 | Nolte | 180/9.48 |
| 3,712,398 | 1/1973 | Althaus | 180/9.48 |
| 3,494,439 | 2/1970 | Kline | 180/6.48 |

Primary Examiner—David Schonberg
Assistant Examiner—Rheinhard J. Eisenzopf

[57] ABSTRACT

The crawler side frames of a crawler crane are slidably supported on axle-like members which, in turn, are slidably supported in the crawler crane car body. The axle-like members are hollow and double acting hydraulic cylinder-piston motors are provided in each axle-like member for the purpose of moving the side frames with respect to the axle-like members, moving the axle-like members with respect to the car body, and for the purpose of removing the side frames and removing the axle-like members. Limits and stops are provided for insuring accomplishment of precisely the desired degree of extension or retraction of each of the members with respect to another.

10 Claims, 10 Drawing Figures

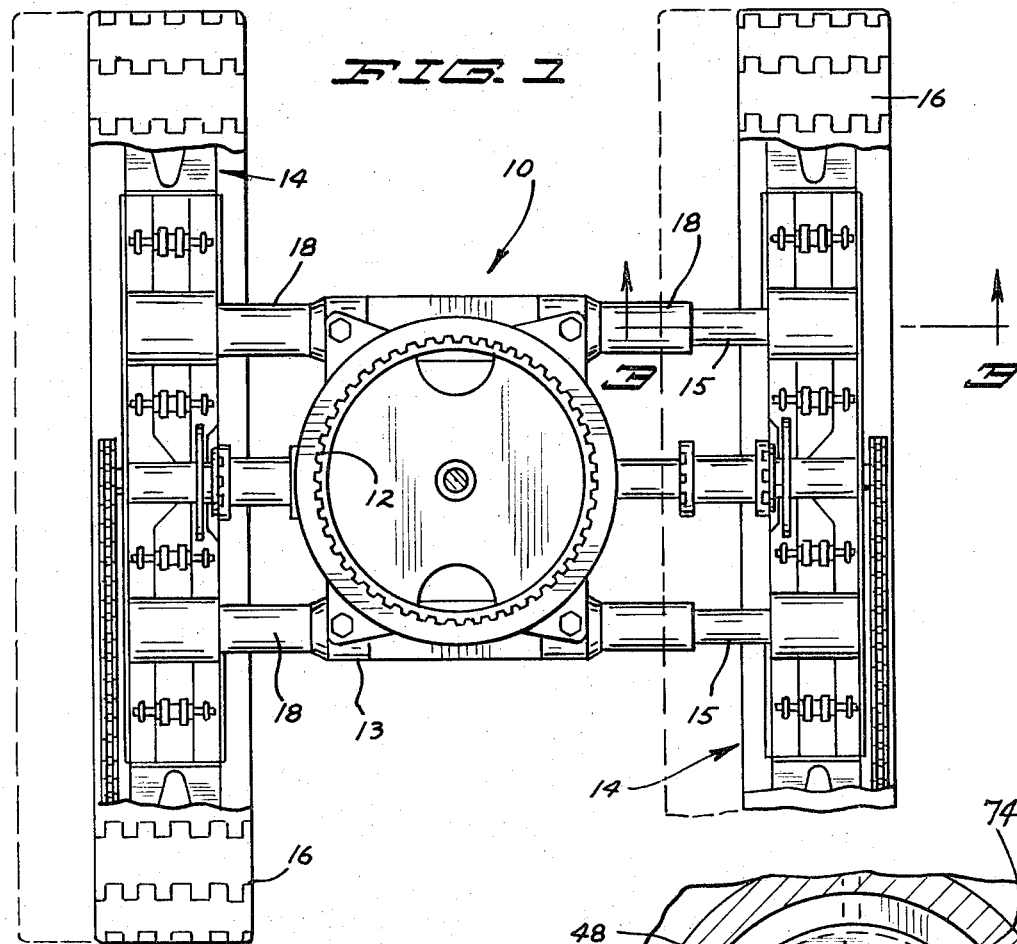
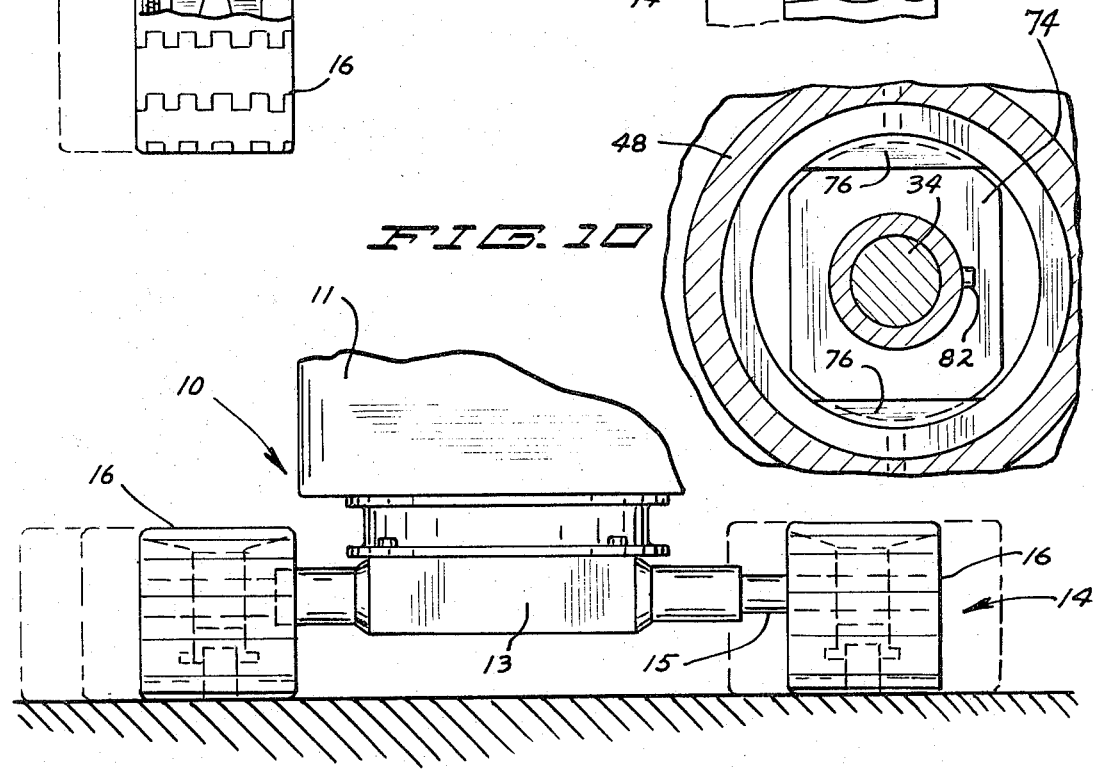

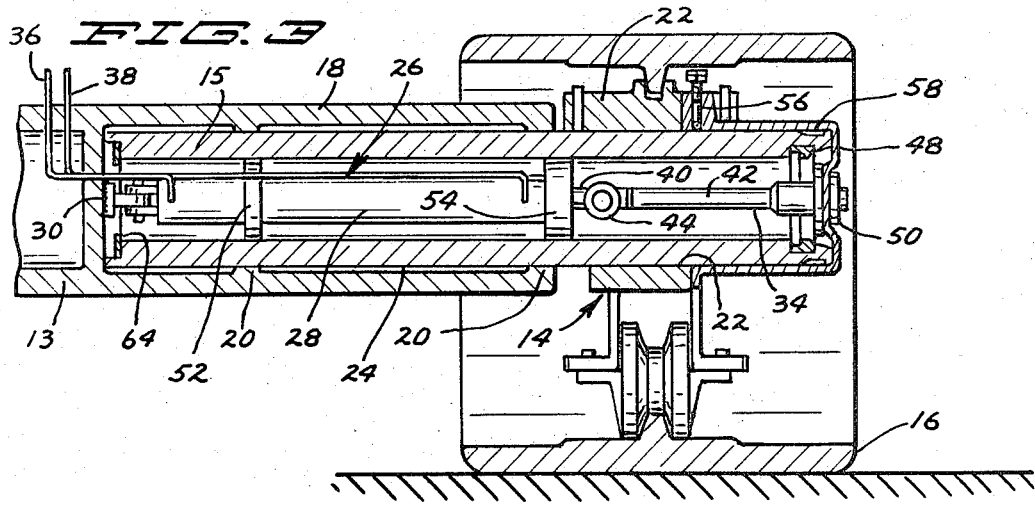
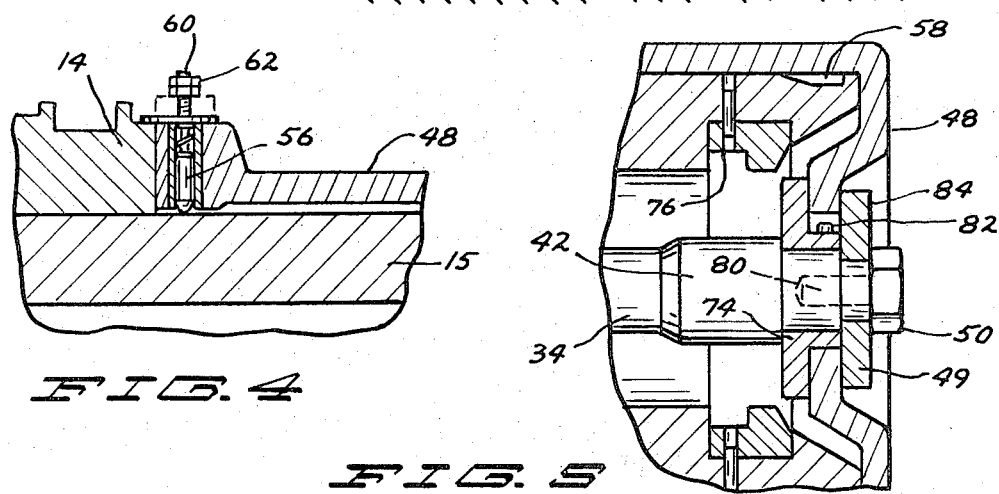
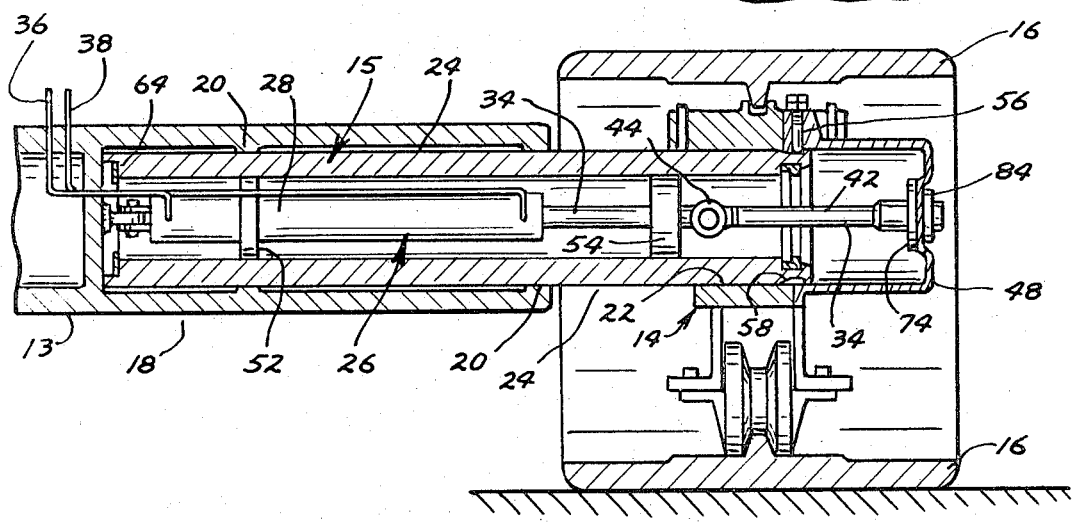

CRAWLER VEHICLE WITH DUAL EXTENSIBLE SIDE FRAMES

BACKGROUND OF THE INVENTION:

This invention has relation to crawler cranes and more particularly to crawler cranes having crawler side frames which are laterally adjustable.

The advantages of having a crawler crane on which the side frames supporting the crawler mechanism can be adjusted selectively to relatively greater width for increased stability in use and to comparatively smaller width for ease of transportation and shipping has been previously recognized. See, for example, U.S. Pat. No. 2,763,330, wherein the crawler frames slide out on fixed axles and on axle extension members which are added onto the outside of the fixed axles. In order to avoid excessive bearing loads on these axle extension members, their length is quite limited.

It is also known to extend the crawler side frames by means of axles which are fixed to the side frames and which slide in and out in provided openings in the carbody. See U.S. Pat. No. 2,681,231. It is known to allow the side frames to slide out and inward on guides which are an extended part of the carbody. See U.S. Pat. Nos. 2,035,858 and 3,494,439. In both of these situations, length of extension travel is extremely limited in order to avoid excessive bearing loads at the support points. In the case of the sliding of the side frames on protrusions from the carbody, the extension travel is limited to the distance which the carbody extension protrudes beyond the retracted side frame up to the outer edge of the crawler shoe.

Lateral adjustment of these crawler track frames must take place at the "on the job" location for use of the crawler equipment, and so an important feature of any such structure must be the convenience of the power means needed to overcome the friction of the heavy crawler track frame on its sliding mounts, together with the proper limiting devices so that the frames are moved with precision by exactly the desired amount.

Another desirable feature is the ability to remove the frames entirely from the carbody so that they can be transported separately between locations for use, thus overcoming the weight restrictions which would otherwise be a limiting factor for over-the-road travel.

BRIEF SUMMARY OF THE INVENTION:

A crawler vehicle made according to the present invention utilizes a plurality of axle-like members slidably mounted in provided openings in the vehicle carbody and also slidably mounted with respect to each one of the crawler track side frames, thus effectively making it possible to provide lateral adjustment of the side frame with respect to the carbody both by the distance which the side frame can safely slide on the axle-like members and by the distance which the axle-like members can safely slide out from the carbody without setting up excessive loading at the bearing points.

The axle-like members are hollow, and a power extensible means such as a double acting hydraulic piston-cylinder motor is supported in each. As shown, a first (cylinder end of the motor is fixedly mounted with respect to the carbody and a second (piston rod) end thereof is detachably mounted sometimes with respect to the crawler side frame, and sometimes with respect to its axle-like member.

Starting with one of the side frames at its innermost or retracted position, activation of its associated power extensible means to cause them to lengthen will force the side frame outwardly with respect to the axle-like member. When the safe outward extension distance of these two parts with respect to each other is reached, stop means associated with the crawler side frame and with the axle-like members coact to limit further outward movement of the side frame with respect to the axle-like member. Further extension of the means will then cause the axle-like members to move with respect to the carbody. This movement continues until stop members associated with the axle-like members and with the carbody coact with each other to prevent further outward movement. The side frame is now situated at its most extended position with respect to the carbody. The other side frame is extended in a like manner.

When it is desired to remove the crawler side frames from the crawler crane, at least the side of the carbody adjacent the first side frame to be removed will be supported on blocks. The side frame and axle-like member stop means will be disabled, the motor piston rod detached from the side frame, and the hydraulic motors or other means will again be extended. This movement is continued until the side frame clears the axle-like members and is thus completely removed from the axle-like members. By applying hydraulic pressure at the opposite end, the motor is retracted to bring the rod within the axle-like member. A locking plate on the outer end of the piston rod is indexed in the axle-like member until it is positioned in a locking groove in the axle-like member, this locking collar and locking groove arrangement serving to prevent longitudinal movement of the piston rod with respect to the axle-like member. The carbody axle stop means is disabled to allow further outward movement of the axle-like member with respect to the carbody. The hydraulic piston-cylinder motor is again elongated. This causes the axle-like member to be slid clear of the carbody. The locking plate is disengaged from the locking groove in the axle-like member, the piston rod is again retracted, and the axle-like member is then free of the carbody.

To reassemble the crawler vehicle, a reverse procedure is followed.

IN THE DRAWINGS:

FIG. 1 is a top plan view of a crawler crane with the cab removed and showing the relationship of the crawler side frames, axle-like members and the carbody;

FIG. 2 is an end elevational view of the crawler crane of FIG. 1;

FIG. 3 is an enlarged, fragmentary, vertical sectional view taken on the line 3—3 in FIG. 1, but showing a crawler side frame in its fully retracted position with respect to the carbody;

FIG. 4 is a further enlarged fragmentary detail sectional view also on the line 3—3 in FIG. 1 showing the relationship between an axle stop pin which is mounted in the cover cap and the axle-like member which it is designed to stop;

FIG. 5 is yet another enlarged vertical sectional view taken on the line 3—3 in FIG. 1, and showing the relationship of a side frame cover cap to the outer end of the axle-like member;

FIG. 6 is a vertical sectional view of the structure as seen in FIG. 3 but showing the relationship of the parts with the side frame fully extended with respect to the axle-like member but with the axle-like member fully retracted with respect to the carbody;

FIG. 10 is a fragmentary, enlarged, and elevational view of the structure of FIG. 9.

Figure 7:
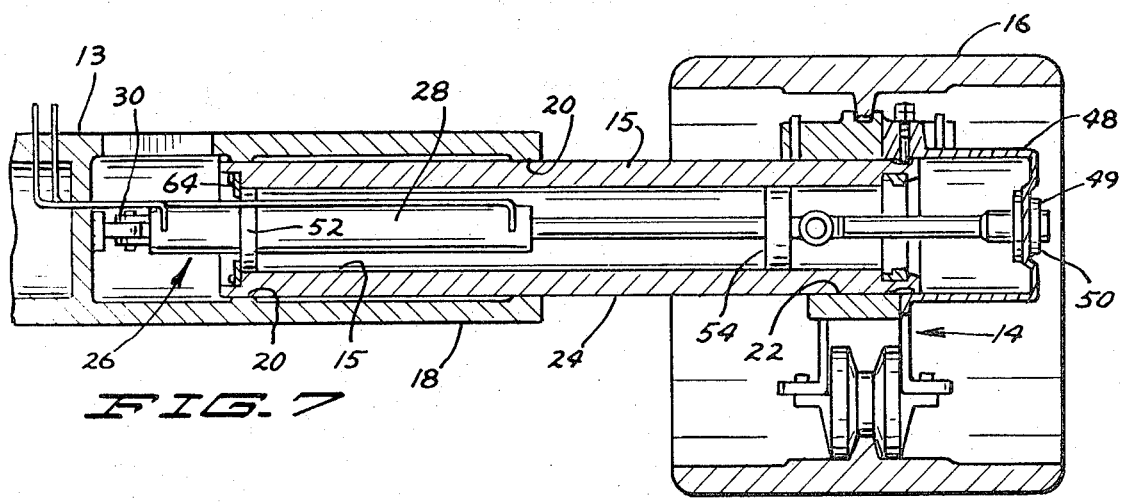
FIG. 7 is a vertical sectional view of the structure as seen in FIG. 3 but with both the axle-like member and the side frame fully extended with respect to the carbody.

DESCRIPTION OF PREFERRED EMBODIMENT:

A crawler crane 10 includes a cab 11 conventionally or otherwise mounted on rotating member 12 of carbody 13. Crawler side frame 14, 14 are slidably mounted for movement between retracted positions close to the carbody and extended positions spaced therefrom. These side frames are mounted on axle-like members 15 in a manner to be described.

Endless crawler tracks 16 are supported on the side frames and in a usual or preferred manner and are driven from a power source associated with the carbody in a manner forming no part of the present invention. A hydraulic drive or a drive mechanism such as disclosed in U.S. Pat. No. 2,763,330 can be used, for example.

The carbody includes, as shown, four axle casings 18 each provided with bearings or seats 20 of size and shape to receive and carry cylindrical outer surface 24 of one of the axle-like members 15. Each of the crawler side frames 14 also provides a cylindrical bearing 22 to receive and support this cylindrical outer surface 24.

The axle-like members are hollow, as shown, and a power extensible means such as a hydraulic cylinder-piston motor 26 is mounted inside of each. As shown in Connection with one of the four of the carbody axle casings 18, axle-like members 15, and hydraulic motors 26, each of these motors includes a cylinder 28 which is fixedly mounted to the carbody as at 30, and also includes a piston 32 operably mounted in said cylinder in such a manner as to power piston rod 34 (see FIG. 8). Appropriate hydraulic lines 36 and 38 lead from a source of pressure and valving (not shown) and are operative to drive the extensible means to cause it to extend in length or retract in length as is desired.

The piston rod 34 is made up of a rod proper 40 which is integrally mounted with respect to piston 32 and of a piston rod extension 42 which is pivotally mounted to the rod proper as at 44. As shown, a cover cap 48 is mounted near each end of each of the side frames 14 in position to provide an opening which is an extension of the bearing surfaces provided by each of the bearings 22 in the side frames. Initially, and all of the time that the crawler crane is to be operated as a single entity without removing either of the axle-like members or the side frames, the outer end of the piston rod extension 42 will be fixedly mounted to the cover cap 48 as at 50.

A stop collar 52 is integrally mounted on the outside of the cylinder 28 and serves to guide the cylinder for sliding movement with relationship to cylindrical inside surface 53 of the axle-like member 15. This stop collar also serves to limit the outward movement of the axle-like member 15 with respect to the carbody and the hydraulic motor cylinder in a manner which is later described.

A piston rod guide collar 54 is integral with the piston rod proper 40 and serves to support the rod in concentric relationship to this interior surface of the axle-like member.

A plurality of spring loaded stop pins 56, only one of which is shown, are resiliently mounted with respect to the crawler side frames to normally bear on the outer surface 24 of the axle-like member. As shown, a stop groove 58 is provided in the outer end portion of each of the axle-like members to receive the stop pins and to thus limit the outward movement of the crawler side frames with respect to the axle-like members. A threaded stem 60 and lock nuts 62 are provided on the outer end of the stop pins so that the stop pins 56 can be held up in position clear of the grooves 58 thus to permit further axial movement of the side frame with respect to the axle-like members when desired.

The innermost end of the axle-like members 15 are each provided with detachably mounted axle stops 64. These stops 64 extend inside of the inner surface 53 of the axle-like members so that the outer movement of the axle-like members with respect to the carbody and to the stop collar 52 will be terminated when the axle stops 64 come in contact with stop collar 52. A suitable access port 78 is provided so that the axle stops 64 can be moved from the axle-like member when this is desired.

As best seen in FIG. 5, the outermost end of the piston rod extension 42 is provided with an alignment hole 68 concentric with the axis thereof and in position to receive an aligning bar 70 for a purpose to be described.

OPERATION:

When both crawler side frames are located at their inwardmost position, the opposite ends of the axle-like members 15 bottom against the frame of the carbody and the inner surface of their associated cover caps 48, respectively. See FIG. 3 and the left side of the crawler in FIGS. 1 and 2. The operation of the apparatus to extend the side frames will be described in connection with the top right hand assemblage, it being understood that each such assemblage will work in the same manner, and that the two axle-like members associated with a single side frame will be activated simultaneously.

The positioning of the parts when the side frames are at their closest spacing to the carbody is illustrated at FIG. 3. Hydraulic pressure will be applied to hydraulic line 36 and the fluid will be allowed to discharge from hydraulic line 38 to cause the power extensible means of motor 26 to be elongated to the end that piston rod 34 moves to the right as seen in FIG. 3. This, acting through cover cap 48, will cause the side frame 14 to tend to move to the right. Simultaneous application of similar pressure from the other extensible means 26 will result in the outward movement of the carwler frame and its tracks toward position as seen in FIG. 6. As this movement progresses, the relative movement of the stop pin 56 with respect to the axle-like member 15 will be to the right, and a point will be reached where these pins will come to rest against the shoulder provided in the groove 58, and further outward movement of the crawler side frames 14 with respect to the axle-like members will be prevented.

Figure 8:
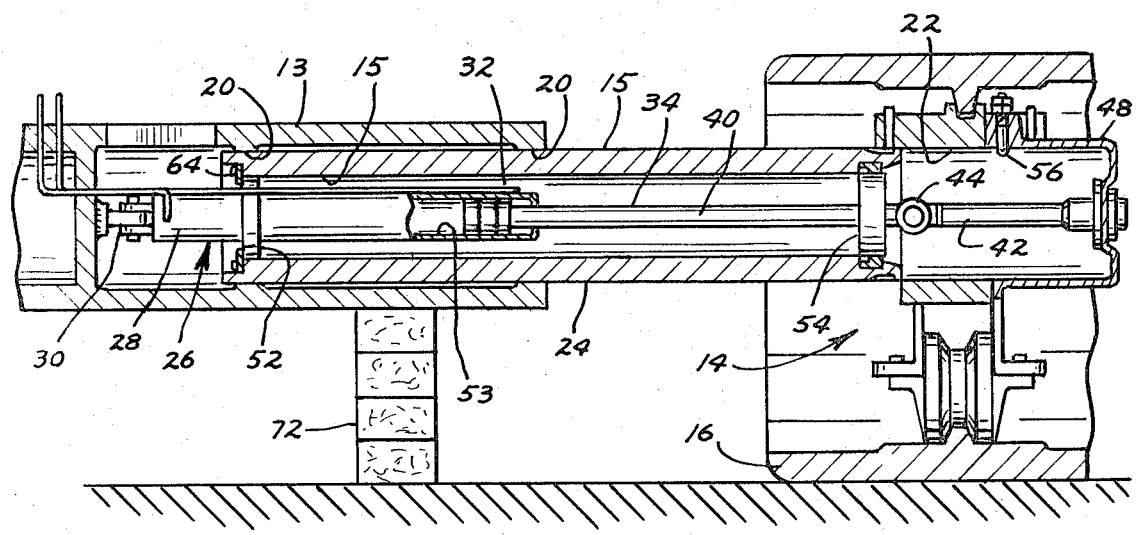
FIG. 8 is a vertical sectional view of the structure as seen in FIG. 3 but with the carbody blocked up to take the weight off of the side frame, and with the side frame virtually completely removed from the axle-like member.

Application of additional pressure to extend the motor or means 26 will result in a sliding movement of the axle-like member on the bearings 20 to the right with respect to the carbody and toward the position as seen in FIG. 7. When the axle stop 64 comes in contact with stop collar 52, there can be no further relative movement of the axle-like member with respect to the carbody. It is to be noted, as best seen in FIGS. 7 and 8, that this motion stops when the axle-like member is still firmly in place in contact with both of the bearings 20-20.

This action will then be repeated as to the crawler side frame to the left as seen in FIGS. 1 and 2. When this has been accomplished, the crawler crane will have the maximum stability against tipping. In the usual situation, the crane will be operated in this configuration to perform its material handling function. However, when lack of clearance dictates, the process just described can be reversed and the crawler side frames brought into or near their minimum spacing for the performance of the usual material handling functions.

When it is desired that the crawler crane be transported by an equipment carrier over the highway, for example, it is often necessary or at least desirable to remove as much weight from the carbody as possible so as not to exceed the highway vehicle axle load limits. It is then desirable to completely remove both the crawler side frames and the axle-like members from the carbody.

Figure 9:
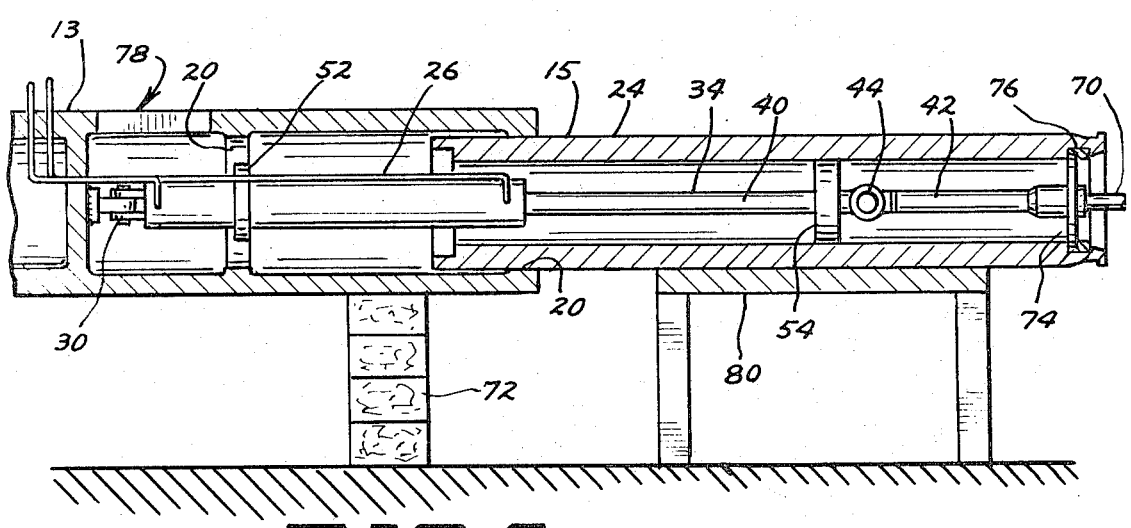
FIG. 9 is a vertical sectional view of the axle-like member and carbody as seen in FIG. 3, but with the axle-like member in position almost entirely removed from the carbody.

In order to accomplish this, the carbody, or at least one side of it, is supported on suitable blocks 72 to take the weight off of at least one of the side frames. This configuration is shown in FIG. 8. The lock nuts 62 are used on the threaded stems 60 to cause the stop pins 56 to be lifted out of the stop grooves 58. Set collars 49 of the mounting means 50 are removed to disconnect the piston rod extensions 42 from the cover caps 48 at each end of the crawler side frame. Hydraulic pressure is again applied to hydraulic line 36 to further extend the hydraulic motor or extensible means 26. This will cause the side frame to be moved entirely off of the axle-like member. This action is pictured in FIG. 8 just before the side frame does leave the axle-like member. The side frame is then completely clear of the axle-like member and can be removed and transported on another vehicle, for example. Hydraulic pressure is then applied to hydraulic line 38 and the line 36 is opened to allow fluid to flow from it, causing the piston rod to be retracted inside of the axle-like member 15. As best seen in FIGS. 9 and 10, a locking plate 74 on the end of the piston rod extension 42 is indexed to bring it into alignment with a locking groove 76 (see FIG. 5) provided in the interior hollow portion of the axle-like member 15. This will prevent longitudinal movement of the piston rod extension 42 with respect to the axle-like member 15.

Using the access port 78, the axle stops 64 are removed or disabled, and further extension of the hydraulic motor or extensible means will cause the axle-like member to be moved clear of its seats 20 in the carbody. The member 15 should be supported as at 80 at this time. The carbody just before removal is accomplished as pictured in FIG. 9.

When retracting the piston rod to bring the locking plate into alignment and register with the locking groove, it is desirable to utilize the aligning bar 70 to manually position the relatively heavy piston rod extension properly as it moves into place.

Once the axle-like member has been removed, the fastening means 44 can be unfastened so that the piston rod extension 42 can be removed. The hydraulic motor will be retracted to the end so that the piston rod will not extend beyond the limits of the carbody for stripped down shipment.

When the crawler crane has been transported to a new construction site, it will be reassembled using a reverse procedure.

The embodiments of the invention in which an exclusive property or privilege is claimed are defined as follows:

1. In a crawler vehicle having a carbody and crawler side frames for supporting and carrying said carbody, means for mounting said side frames to said carbody to permit lateral adjustment of the spacing of the side frames with respect to said carbody, said means including:

axle-like members;

bearings in said carbody for slidably receiving said axle-like members, each in parallel spaced apart relation to at least one other such member;

bearings in said crawler side frames for slidably supporting said axle-like members;

means for limiting inward movement of said axle-like members into said carbody and for limiting the inward movement of said side frames encompassing said axle-like members;

means for indicating a predetermined maximum safe working projection outward of said axle-like members from said carbody and for indicating a predetermined maximum safe working extension outward of said crawler frames along said axle-like members; and means for moving said axle-like members selectively inwardly and outwardly in said carbody bearings and for moving said crawler side frames on said side frame bearings selectively inwardly and outwardly with respect to said axle-like members.

2. The combination of claim 1 wherein said axle-like members are hollow and each of said means for moving said axle-like members and said side frames includes a power extensible means in one of said hollow members having a first end thereof fixedly mounted with respect to the carbody and a second end extendible with respect to the first end and fixedly mounted with respect to the crawler side frame in which its hollow member is supported.

3. The combination of claim 2 wherein said means for indicating maximum safe working projection of said axle-like members from said carbody is constituted as cooperating axle stop means mounted with respect to said carbody and with respect to said axle-like members; and wherein said means for indicating safe working extension of said side frames along said axle-like members is constituted as cooperating frame stop means mounted with respect to said side frames and with respect to said axle-like members.

4. The combination of claim 2 wherein the power extensible means is constituted as a double acting hydraulic motor having a cylinder, a piston and a piston rod extending out from the cylinder.

5. The combination of claim 4 wherein the first end of the motor is the cylinder end and the second end is a piston rod end.

6. The combination of claim 5 wherein said means for indicating maximum safe working projection of said axle-like members from said carbody is constituted as cooperating axle stop means mounted with respect to said carbody and with respect to said axle-like members; and wherein said means for indicating safe working extension of said side frames along said axle-like members is constituted as cooperating frame stop means mounted with respect to said side frames and with respect to said axle-like members.

7. In a crawler vehicle having a carbody and crawler side frames for supporting and carrying said carbody, means for mounting said side frames to said carbody to permit lateral adjustment of the spacing of said side frames with respect to said carbody, said means including:
- axle-like members;
- bearings in said carbody for slidably receiving said axle-like members, each in parallel spaced apart relation to at least one other such member;
- bearings in said crawler side frames for slidably supporting said axle-like members;
- means for limiting inward movement of said axle-like members into said carbody and for limiting the inward movement of said side frames encompassing said axle-like members;
- means for indicating a predetermined maximum safe working projection outward of said axle-like members from said carbody and for indicating a predetermined maximum safe working extension outward of said crawler frames along said axle-like members;
- means for moving said axle-like members selectively inwardly and outwardly in said carbody bearings and for moving said crawler side frames on said side frame bearings selectively inwardly and outwardly with respect to said axle-like members;
- said axle-like members being hollow and each of said means for moving said axle-like members and said side frames including a power extensible means in one of said hollow members having a first end thereof fixedly mounted with respect to the carbody and a second end extendible with respect to the first end and fixedly mounted with respect to the crawler side frame in which its hollow member is supported;
- the power extensible means being constituted as a double acting hydraulic motor having a cylinder, a piston and a piston rod extending out from the cylinder; the first end of the motor being the cylinder end and the second end being the piston rod end;
- said means for indicating maximum safe working projection of said axle-like members from said carbody being constituted as cooperating axle stop means mounted with respect to said carbody and with respect to said axle-like members; said means for indicating safe working extension of said side frames along said axle-like members being constituted as cooperating frame stop means mounted with respect to said side frames and with respect to said axle-like members; and means for disabling said frame stop means to allow said piston rods to move the crawler frames entirely off of the axle-like members upon extension of said motor means.

8. The combination of claim 7 wherein said rod ends of said motors can be unmounted with respect to said crawler side frames, means for mounting said rod ends fixedly with respect to said axle-like members, means for disabling said axle stop means to allow said rods to completely remove said members from said carbody upon extension of said motor means.

9. The combination of claim 8 wherein the piston rods are each made up of two parts:
- first, a piston rod proper rigid with the piston and of a length to fit substantially entirely within the carbody when the motor is in its completely retracted position; and
- second, a piston rod extension of length when attached to the piston rod proper to extend at least far enough to move the side frames and axle-like members to their maximum outward safe working positions;
- there being detachable means for fastening said rod extensions to said rods proper.

10. The combination of claim 9 wherein said rod is of length to move the side frames clear of the axle-like members and to move the axle-like members clear of the carbody.

* * * * *

O-1050
(5/69)

UNITED STATES PATENT OFFICE
CERTIFICATE OF CORRECTION

Patent No. 3,820,616　　　　　　Dated　June 28, 1974

Inventor(s)　Dieter C. Juergens

It is certified that error appears in the above-identified patent and that said Letters Patent are hereby corrected as shown below:

Column 1, line 65, the word "cylinder" should be in parentheses.

Column 4, line 67, "carwler" should be --crawler--.

Column 4, line 41, enter a period after "thereof"; same line, cancel "and", and insert --This hole is--.

Column 4, lines 42 and 43, after "described." insert -- See Figure 9. --.

Column 5, line 3, "pin" should be --pins--.

Column 5, cancel last paragraph and reinsert it at Column 6, line 9.

Column 6, line 7, cancel "utilize", insert --place--; same line, after "bar 70", insert --into alignment opening 68 and to use bar 70 to--.

IN THE DRAWINGS:

Figure 5, add the numeral 68 and lead line as shown and break away a portion of the rod extension 42 to show alignment opening 68. Remove the numeral 80 and its lead line.

See page 2

PO-1050
(5/69)

UNITED STATES PATENT OFFICE
CERTIFICATE OF CORRECTION

Patent No. 3,820,616        Dated June 28, 1974

Inventor(s) Dieter C. Juergens

It is certified that error appears in the above-identified patent and that said Letters Patent are hereby corrected as shown below:

Figure 7, change the numeral 15 (left occurrence) to read "53".

Figure 8, remove numeral 15 and lead line (left occurrence); add numerals and lead lines 36 and 38; extend lead line for 52; reposition end of lead line from 53.

Figure 9, extend lead line from 26.

Signed and sealed this 7th day of January 1975.

(SEAL)
Attest:

McCOY M. GIBSON JR.
Attesting Officer

C. MARSHALL DANN
Commissioner of Patents